United States Patent
O'Rourke et al.

(10) Patent No.: US 7,173,933 B1
(45) Date of Patent: Feb. 6, 2007

(54) SYSTEM AND METHOD FOR PROVIDING SOURCE AWARENESS IN A NETWORK ENVIRONMENT

(75) Inventors: Chris O'Rourke, Apex, NC (US); Robert M. Batz, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 996 days.

(21) Appl. No.: 10/166,996

(22) Filed: Jun. 10, 2002

(51) Int. Cl.
*H04L 12/56* (2006.01)
(52) U.S. Cl. .................................. 370/389
(58) Field of Classification Search ............ 370/389, 370/400, 401
See application file for complete search history.

(56) References Cited

U.S. PATENT DOCUMENTS

| | | | |
|---|---|---|---|
| 5,602,907 A | 2/1997 | Hata et al. ............ | 379/114 |
| 5,822,411 A | 10/1998 | Swale et al. ........... | 379/111 |
| 5,828,737 A | 10/1998 | Sawyer ................. | 379/114 |
| 5,905,736 A | 5/1999 | Ronen et al. .......... | 370/546 |
| 5,909,238 A | 6/1999 | Nagashima et al. .... | 348/3 |
| 5,946,670 A | 8/1999 | Motohashi et al. .... | 705/400 |
| 5,956,391 A | 9/1999 | Melen et al. .......... | 379/114 |
| 5,970,477 A | 10/1999 | Roden .................. | 705/32 |
| 5,987,498 A | 11/1999 | Athing et al. .......... | 709/203 |
| 6,016,509 A | 1/2000 | Dedrick ................ | 709/224 |
| 6,035,281 A | 3/2000 | Crosskey et al. ...... | 705/14 |
| 6,047,051 A | 4/2000 | Ginzboorg et al. .... | 379/130 |
| 6,141,684 A | 10/2000 | McDonald et al. .... | 709/222 |
| 6,208,977 B1 | 3/2001 | Hernandez et al. .... | 705/34 |
| 6,230,012 B1 | 5/2001 | Willkie et al. ......... | 455/435 |
| 6,282,573 B1 | 8/2001 | Darago et al. ........ | 709/229 |
| 6,298,383 B1 | 10/2001 | Gutman et al. ........ | 709/229 |
| 6,377,571 B1 | 4/2002 | Tai ..................... | 370/355 |
| 6,377,982 B1 | 4/2002 | Rai et al. .............. | 709/217 |
| 6,389,462 B1 * | 5/2002 | Cohen et al. .......... | 709/218 |
| 6,393,482 B1 | 5/2002 | Rai et al. .............. | 709/225 |
| 6,400,722 B1 | 6/2002 | Chuah et al. .......... | 370/401 |
| 6,414,950 B1 | 7/2002 | Rai et al. .............. | 370/338 |
| 6,421,714 B1 | 7/2002 | Rai et al. .............. | 709/217 |
| 6,466,571 B1 | 10/2002 | Dynarski et al. ....... | 370/352 |
| 6,480,485 B1 | 11/2002 | Kari et al. ............. | 370/352 |

(Continued)

FOREIGN PATENT DOCUMENTS

WO   WO 98/26381   12/1997

(Continued)

OTHER PUBLICATIONS

Online Inc., "Apogee Releases Content Usage-Based Billing Product Annotated Title—Software allows content usage-based billing," EContent, vol. 24, No. 5, NDN 173-0356-6509-7, 1 pg., Jul. 2001.

(Continued)

*Primary Examiner*—Derrick Ferris
(74) *Attorney, Agent, or Firm*—Baker Botts L.L.P.

(57) ABSTRACT

A method for communicating in a network environment is provided that includes receiving a request packet and positioning an identifier into the request packet. The identifier may be identified and correlated to a source that generated the request packet. An internet protocol (IP) address associated with the source may be positioned in the request packet before communicating the request packet to a next destination.

45 Claims, 2 Drawing Sheets

U.S. PATENT DOCUMENTS

| | | |
|---|---|---|
| 6,512,754 B2 | 1/2003 | Feder et al. ............... 370/338 |
| 6,529,501 B1 | 3/2003 | Zhao et al. ............... 370/353 |
| 6,611,821 B2 | 8/2003 | Stahl et al. ............... 705/400 |
| 6,671,675 B2 | 12/2003 | Iwamura ............... 705/30 |
| 6,728,266 B1 | 4/2004 | Sabry et al. ............... 370/468 |
| 6,757,371 B2 | 6/2004 | Kim et al. ............... 379/114.22 |
| 2001/0023428 A1 | 9/2001 | Miyazaki et al. ............... 709/201 |
| 2002/0059114 A1 | 5/2002 | Cockrill et al. ............... 705/27 |
| 2002/0138601 A1 | 9/2002 | Piponius et al. ............... 709/223 |
| 2002/0176427 A1* | 11/2002 | Noda et al. ............... 370/401 |
| 2003/0233329 A1* | 12/2003 | Laraki et al. ............... 705/52 |

FOREIGN PATENT DOCUMENTS

| | | |
|---|---|---|
| WO | WO 99/31610 | 12/1998 |

OTHER PUBLICATIONS

Centaur Communications, "Secret Bear platform allows paid-for SMS Annotated Title—Secret Bear introduced cross-network reverse billing platform allowing content providers to charge for SMS content," New Media Age, NDN 173-0354-6130-3, 1 pg., Jun. 28, 2001.

Karsten Lüttge, "E-Charging API: Outsource Charging to a Payment Service Provider," NDN 174-0708-0924-8, pp. 216-227, 2001.

A. Herzberg, "Safeguarding Digital Library Contents: Charging for Online Content," D-Lib Magazine, NDN 174-0590-9051-8, 16 pgs., Jan. 1998.

Business Wire, "Apogee Networks Introduces Industry's First Content Usage-Based Billing Solution for Web Hosters," NDN 219-0281-6988-1, 2 pgs., May 8, 2001.

Business Wire, "Apogee Networks Announces Investment by Cisco Systems; Combined Efforts Enhance Billing Capabilities for Content Delivery Network Providers," NDN 219-0220-9035-0, 2 pgs., Jan. 23, 2001.

Business Wire, "Key Analysts Predict Content Billing is the Internet's New Frontier; Content is the Asset of the Industry; Apogee Networks Seen as the Leader in New Internet Industry Space," NDN 219-0162-6934-6, 3 pgs., Oct. 10, 2000.

Business Wire, "Apogee Networks Unveils NetCountant Wireless Billing At SUPERCOMM; Company Demonstrates Industry First Wireless Content Usage Based Billing Solution," NDN 218-0324-8075-6, 2 pgs., Jun. 5, 2001.

Business Wire, "Apogee Networks Wins 2000 Communications ASP Product of the Year Award; Apogee Networks' NetCountant Billing Takes Top Honors for Innovative Content Usage Based Billing Solutions," NDN 218-0282-3757-7, 2 pgs., Mar. 21, 2001.

Business Wire, "Wireless Internet Content Billing and Settlement Capability Announced; Companies Announce Interoperability Between WAP Gateway and Content Billing System," NDN 218-0220-0997-2, 2 pgs., Dec. 6, 2000.

Business Wire, "Apogee Networks Joins Content Alliance; Billing Expert to Join Industry Group Aimed At Advancing Content Networking," NDN 218-0181-2716-7, 3 pgs., Oct. 11, 2000.

Business Wire, "Apogee Networks, Inc. and Paysys International, Inc. to Integrate Technologies to Create Advanced IP Content Billing Solutions," NDN 218-0098-0623-9, 3 pgs., Jun. 19, 2000.

* cited by examiner

SYSTEM AND METHOD FOR PROVIDING SOURCE AWARENESS IN A NETWORK ENVIRONMENT

TECHNICAL FIELD OF THE INVENTION

This invention relates in general to the field of network communications and more particularly to a system and method for providing source awareness in a network environment.

CROSS REFERENCE TO RELATED APPLICATIONS

This Application is related to U.S. patent application Ser. No. 10/075,830 filed Feb. 12, 2002, entitled "SYSTEM AND METHOD FOR PROVIDING SOURCE AWARENESS IN A WIRELESS APPLICATION PROTOCOL NETWORK ENVIRONMENT."

BACKGROUND OF THE INVENTION

Networking services have become increasingly important in today's society. One feature of networking services relates to client or source awareness. Certain services, functions, or capabilities may be provided to a group of end users or to clients based on the identity of the end users or on a corresponding source profile. Devices or components within a network must generally be able to identify an end user or a source profile before offering selected enhanced services, functions, or capabilities to the end user. Accordingly, sufficient information must be made available at various networking layers in order to allow for the accurate identification of a client or a source.

In some environments, the source identification may be hidden or otherwise transformed such that the original source or end user is hidden from the perspective of the destination point that receives a message. This may result in a device or a component that receives the message being unable to determine a point of origin associated with a data request. This blindness or shielding creates a problem in attempting to offer services to certain end users. In some instances, the inability to determine the origination of a data flow precludes a device or a component from offering services such as priority, content filtering, and accounting operations, which may all be based on the identity of an end user.

SUMMARY OF THE INVENTION

From the foregoing, it may be appreciated by those skilled in the art that a need has arisen for an improved communications approach that provides the capability for devices or components to identify a source associated with a data packet in a network environment. In accordance with one embodiment of the present invention, a system and method for providing source awareness in a network environment is provided that substantially eliminate or greatly reduce disadvantages and problems associated with conventional source awareness techniques.

According to one embodiment of the present invention, there is provided a method for providing source awareness in a network environment that includes receiving a request packet and positioning an identifier into the request packet. The identifier may then be identified and correlated to a source that generated the request packet. An internet protocol (IP) address associated with the source may be positioned in the request packet before communicating the request packet to a next destination.

Certain embodiments of the present invention may provide a number of technical advantages. For example, according to one embodiment of the present invention, a communications approach is provided that allows a device or a component within a network environment to identify a source associated with the request packet that it received. This allows receiving devices and components within the network environment to provide authentication, authorization, and accounting elements to a group of targeted end users. Additionally, this identification may allow receiving elements to offer networking features or capabilities (such as priority, accounting services, and access permissions or capabilities, for example) to a source based on the corresponding source IP address. These enhanced services may be based on a unique identifier that is positioned within an information or data packet as it propagates through the network environment. The unique identifier allows devices or components that later receive the request packet to correlate a source profile of an end user with the request packet. This operation restores the identity of an end user that originally generated the data packet and allows networking elements to identify an end user based on the unique identifier. Embodiments of the present invention may enjoy some, all, or none of these advantages. Other technical advantages may be readily apparent to one skilled in the art from the following figures, description, and claims.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which.

DETAILED DESCRIPTION OF THE INVENTION

Figure 1:
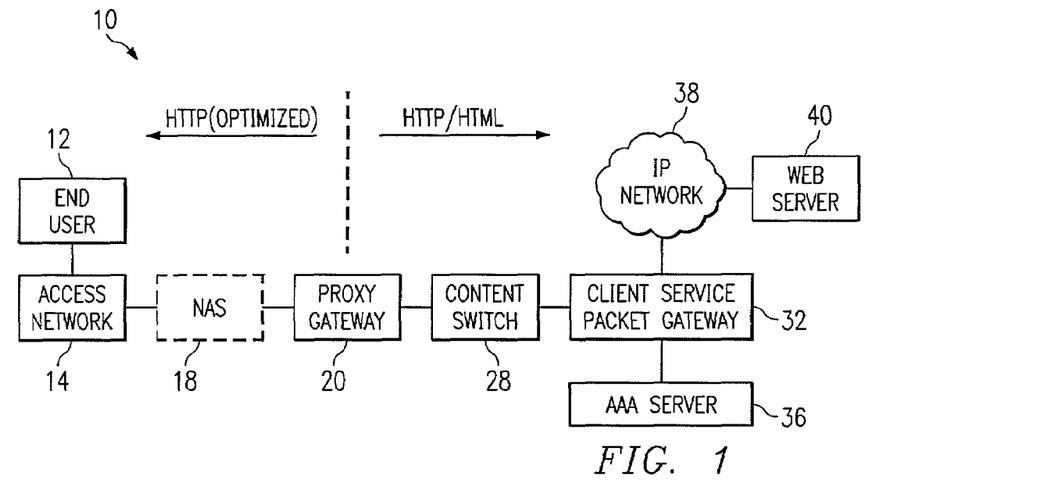
FIG. 1 is a simplified block diagram of a system for providing source awareness in a network environment in accordance with one embodiment of the present invention.

FIG. 1 is a simplified block diagram of a communication system 10 for providing source awareness in a network environment in accordance with one embodiment of the present invention. Communication system 10 includes an end user 12, an access network 14, a network access server (NAS) 18, and a proxy gateway 20. Communication system 10 also includes a content switch 28, a client service packet gateway (CSPG) 32, an authentication, authorization, and accounting (AAA) server 36, an internet protocol (IP) network 38, and a web server 40.

According to the teachings of one embodiment of the present invention, proxy gateway 20 operates to position a unique identifier into a request packet generated by end user 12. The unique identifier may be identified by content switch

28, which correlates the unique identifier with a source profile or an identity associated with end user 12. The source profile may contain any end user parameters or source characteristics that provide an identity for an end user or for a source to networking components, devices, equipment, and elements within or external to communication system 10. Content switch 28 may then replace the source IP address in the request packet with the source IP address of end user 12 (or some IP address that represents end user 12) before communicating a request packet to a next destination. This translation of the source IP address (from proxy gateway 20 to end user 12) restores the identity of end user 12 and allows elements, components, or objects that receive the request packet from content switch 28 to properly identify a point of origin associated with the request packet. This allows particular services, features, or capabilities to be provided to selected end users based on their source profile as matched by content switch 28 to their unique identifier included within the request packet.

End user 12 is a client or customer wishing to initiate a communication in communication system 10 via access network 14. End user 12 may be inclusive of devices used to initiate a communication, such as a computer, a personal digital assistant (PDA), a laptop or electronic notebook, a telephone, or any other device, component, element, or object capable of initiating voice or data exchanges within communication system 10. End user 12 may also be inclusive of a suitable interface to the human user, such as a microphone, a display, or a keyboard or other terminal equipment (such as for example an interface to a personal computer or to a facsimile machine in cases where end user 12 is used as a modem). End user 12 may also be any device that seeks to initiate a communication on behalf of another entity or element, such as a program, a database, or any other component, device, element, or object capable of initiating a voice or a data exchange within communication system 10. Data, as used herein in this document, refers to any type of numeric, voice, or script data, or any type of source or object code, or any other suitable information in any appropriate format that may be communicated from one point to another.

Access network 14 represents a series of points or nodes of interconnected communication paths for receiving and transmitting packets of information that propagate through communication system 10. Access network 14 offers a communicative interface between end user 12 and NAS 18 and may provide a point-to-point (PPP) connection in certain embodiments. Access network 14 may implement any communications protocol such as dial, cable, digital subscriber line (DSL), radio, wireless local area network (WLAN), or any other suitable communications protocol that allows packet communications or tunneling to (or through) access network 14 and to NAS 18. Access network 14 may also be inclusive of a radio access network (RAN) where appropriate or a hub that allows end user 12 to log onto or otherwise access an Ethernet network.

Access network 14 may also include authentication features provided to end user 12. In a particular embodiment, access network 14 represents a packet data network (PDN), however access network 14 may be any suitable network where appropriate and according to particular needs. Access network 14 offers a communications interface between end user 12 and NAS 18. Access network 14 may be any LAN, WLAN, metropolitan area network (MAN), or wide area network (WAN) or any other appropriate architecture or system that facilitates communications in a network environment. Access network 14 implements a transmission control protocol/internet protocol (TCP/IP) communications language architecture in a particular embodiment of the present invention. However, access network 14 may alternatively implement any other suitable communication protocol for transmitting and receiving data packets within communication system 10.

NAS 18 is an element that provides access to any network (such as access network 14) for end user 12. NAS 18 may be used with a TCP/IP network, including serial terminal access controllers, modem pools or stacks, integrated services digital network (ISDN) routers, or multi-function access controllers where appropriate. NAS 18 may also be used in combination with any element that provides switched service connections, PPP serial IP protocols, or user authentication functions according to particular needs. NAS 18 may support serial line internet protocol (SLIP) and/or PPP protocols, allowing NAS 18 to establish and to manage the individual communications links to remote sites across a switched service. NAS 18 may properly authenticate end user 12 before allowing access to a network or to another server. NAS 18 may also store one or more identification elements or passwords that may be used in authenticating end user 12.

In a particular embodiment of the present invention, the communication protocol implemented by NAS 18 is RADIUS (as described in detail below). NAS 18 may alternatively use terminal access controller access control system (TACACS), or diameter, or any other suitable communications protocol in order to provide an authentication functionality. NAS 18 may use a network access identifier (NAI), such as the user-ID submitted by end user 12 for example, during PPP authentication. The NAI may be used to identify end user 12 as well as to assist in the routing of an authentication request. In operation, NAS 18 operates to bring up a communication session with end user 12. NAS 18 may also provide accounting or authorization functions on behalf of end user 12 and perform IP address management for end user 12 where appropriate.

In operation, NAS 18 may terminate PPP connections or communication links and may generally correspond to the communication protocol implemented by access network 14. For example, a gateway general packet radio service (GPRS) support node (GGSN) element may correspond to a radio communication implementation where data may be communicated over a 56 k link that works in conjunction with serving GPRS support nodes (SGSNs) in communicating high-speed data exchanges within communication system 10.

In an alternative embodiment of the present invention, NAS 18 may be removed from communication system 10 or substituted with any element capable of performing some of the functions of NAS 18. NAS 18 is illustrated as a hatched-line box to represent the ability of communication system 10 to operate without it. NAS 18 could be removed in various applications such as for example with use in a cable implementation via PPP over Ethernet (PPPOE), where data may be tunneled over or across the PPPOE connection. The data may be communicated to an element like NAS 18 that provides an interface between access network 14 and proxy gateway 20. Alternatively, IP packets (not tunneled in PPPOE) may be routed from the time they arrive on the network, whereby the IP packets may be directly sent to an element that receives the data. Additionally, some or all of the functions of NAS 18 may be provided in access network 14. Accordingly, access network 14 may be configured in any appropriate manner in order to provide PPP and RADIUS-type mechanisms for features such as authentication, authorization, accounting, content filtering, and priority, for example.

Proxy gateway 20 is a network point or node that operates as a data exchange interface between access network 14 and content switch 28. Proxy gateway 20 may be a web proxy, a content optimization engine, an optimization cache, an element that converts proprietary information into a suitable format, or any other communicative interface that exchanges data between NAS 18 and IP network 38.

Proxy gateway 20 allows a device or component or end user 12 to initiate a request from access network 14 and may then generally facilitate the delivery of the requested data back to the source associated with the request. Such data may be translated into a suitable format, such that the source of the requested data may be able to interpret the information properly or such that the requested data may be adequately displayed on a suitable device or component. Proxy gateway 20 may look into the browser type invoked by end user 12 and execute formatting, re-formatting, transcribing, or reconfiguration of content or data such that it may be properly viewed at a next destination such as a PDA, a laptop, or a CPU monitor, for example.

Information provided to proxy gateway 20 by IP network 38 may be generally in an HTTP/hyper-text markup language (HTML) format as illustrated by the arrow in FIG. 1. HTTP represents a platform for exchanging files (text, graphic images, sound, video, and other multimedia files) on the world wide web. HTML is the set of markup symbols or codes inserted in a file intended for display on a world wide web browser page. The markup language instructs the web browser on how to display a web page's text and images for the user.

In operation, proxy gateway 20 retrieves and translates (or transcodes) information from a network for access or viewing by end user 12. Such information could be a web page for example, where proxy gateway 20 operates to convert such data into a configuration (such as a card format) that is displayable to end user 12. As illustrated by arrows in FIG. 1 and a dashed line from proxy gateway 20, proxy gateway 20 converts pages retrieved from the network into optimized hyper-text transfer protocol (HTTP) in accordance with a particular embodiment of the present invention. Optimized HTTP is a language that allows the text portions of web pages to be presented on corresponding devices being used by end user 12. Alternatively, proxy gateway 20 may be used in conjunction with compressed HTTP (CHTTP) or HTTP generally, or any other communications format or protocol according to particular needs.

Proxy gateway 20 positions a user identifier (or user-ID) into an HTTP request packet to provide or otherwise restore an identity for the source that initiated the request. For example, proxy gateway 20 may position an integrated services digital network (ISDN) identifier into a request packet in order to implant or otherwise to provide an identity for the source that initiated the request packet. In a particular embodiment of the present invention, proxy gateway 20 provides the identifier in the HTTP portion of an HTTP header. Alternatively, proxy gateway 20 may transform or manipulate information in the request packet such that the source is properly identified. Proxy gateway 20 may include any suitable software, hardware, component, or element operable to position a unique identifier into a request packet or to transform existing packet information such that it reflects the identity of a source or an end user.

The user-ID represents a unique identifier that provides a correlation to a source profile or to an end user. Thus, the user-ID provides a point of origin designation for a specific request packet propagating through communication system 10. The user-ID may serve as a temporary identifier where user-IDs are recycled continuously or the user-ID may serve as a permanent identifier where appropriate and stored in a statically configured table (as described in greater detail below with reference to FIG. 2).

In a particular embodiment of the present invention, the user-ID that is positioned by proxy gateway 20 is an IP address of end user 12. Alternatively, the user-ID may be any element, object, or piece of data that operates to uniquely identify or distinguish an end user that generates a request packet in a network environment. For example, the user-ID may be a user name or a phone number or any other piece of data that distinguishes one end user 12 from another.

Figure 2:
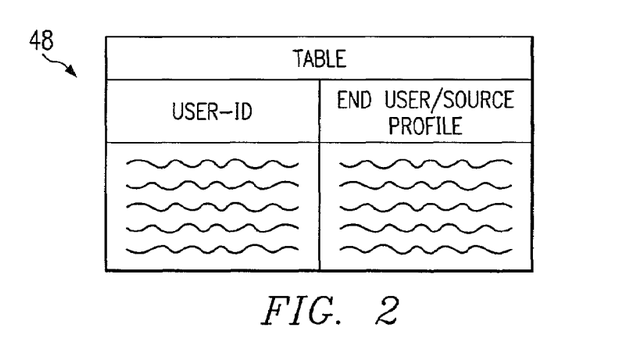
FIG. 2 is a simplified block diagram of a table that may be included within (or independent of) a number of elements within the system of FIG. 1.

Content switch 28 is a communication element that may identify the user-ID provided by proxy gateway 20. Content switch 28 may include any suitable hardware, software, component, or element operable to facilitate the identification of the unique identifier provided by proxy gateway 20. In a particular embodiment of the present invention, content switch 28 includes a table (such as table 48 as illustrated in FIG. 2 and described in more detail below) that matches a user-ID to end user 12 or its corresponding source profile. The table may be a separate element or included within any suitable component or object such as a database or CSPG 32, proxy gateway 20, or AAA server 36, for example. In a basic or a simple case scenario, the table included within content switch 28 may be static, i.e. relatively unchanging. For example, end user 12 could have a user-ID that is a phone number, which is generally static. The phone number may correlate to the end user's IP address. In certain embodiments, where the user-ID is a end user's IP address, a table to be included in content switch 28 may be unnecessary and therefore eliminated entirely in accordance with the teachings of the present invention.

In operation, content switch 28 may operate to maintain a table of relationships and to effectively undo the address hiding or address shielding that may be performed by proxy gateway 20. By interpreting a correlation between the user-ID and the end user or source profile, content switch 28 may offer a tool for providing or restoring accurate source information to elements and components within the network that may in turn offer services or enhanced capabilities to end user 12 or to an associated source profile. Alternatively, content switch 28 may be able to access a database to identify the relationships between user-IDs and each end user 12 (or source profile) communicating in a network environment.

Content switch 28 effectively communicates a request packet having the source equal to end user 12 and the corresponding destination to some point in the network, such as web server 40 or IP network 38, for example. This translation of source IP addressing information operates to identify end user 12 accurately. As described above, proxy gateway 20 may provide a user-ID in the request packet. Content switch 28 addresses the problem of screening an end user's IP address by translating (referred to in certain scenarios as a NAT (network address translation) execution or NATing) the proxy gateway address back to the address of end user 12. This identification feature stands in contrast to systems or devices which may operate to change or modify the source information in processing a request packet such that the new source information does not accurately reflect the origin of the request packet.

Content switch 28 may use HTTP information in order to identify a source associated with the request packet in several ways. For example, content switch 28 may learn about end user 12 or a source through RADIUS packet inspection or by directly querying an element, such as NAS 18 or access network 14. Content switch may also learn about end user 12 or a source through diameter communication protocols, TACACS protocols, or any other communications protocol used in network applications. TACACS generally represents an industry standard protocol specification, RFC 1492, that forwards username and password information to a centralized server. The centralized server can either be a TACACS database or a database like the UNIX password file with TACACS protocol support. For example, the UNIX server with TACACS passes requests to the UNIX database and sends the accept or reject message back to the access server. Content switch 28 may also perform any necessary decrypting protocols or other suitable transformations where appropriate as a request packet propagates through communication system 10.

CSPG 32 is a client-aware device that may provide or offer some service or feature to end user 12. Such services are based on an effective mapping between a source IP address of a given request packet and a user profile. These client-aware devices may utilize the source IP address in providing services to end user 12. There are a number of reasons why a device or a component would want to identify the source or end user 12 associated with a communication session. For example, some devices may wish to identify end user 12 for authorization purposes. In another example, a device may wish to maintain user profiles to provide for accounting records (for example per-user accounting) or to provide for content billing information. Alternatively, a device or a component may use an identifier to provide for any other type of suitable client-aware service, tool, or feature according to particular needs of network components or equipment. Additional services may be related to areas such as routing, permissions or access granting mechanisms, accounting, priority, billing information, firewalling, content filtering, or any other suitable parameters or policies where user-aware characteristics serve as a basis for network service implementation.

As described above, CSPG 32 uses the identity of the client or end user 12 in order to provide services based on a source profile. In a particular embodiment of the present invention, CSPG 32 provides client-aware services by operating at networking layers 2 and 3. Accordingly, the information available at networking layers 2 and 3 provides a basis for the identification of end user 12. Alternatively, CSPG 32 may provide a client-aware service by operating at any communications layer or level according to particular needs. CSPG 32 may use an IP address or any other suitable parameter to uniquely identify a client or end user 12 in offering a service, an enhanced capability, or a feature to end user 12. CSPG 32 may include any suitable hardware, software, component, or element that identify a unique identifier such that some networking feature or capability may be provided to end user 12.

In an alternative embodiment of the present invention, either CSPG 32 or content switch 28 (or both) may be provided within proxy gateway 20 (or CSPG 32 and content switch 28 may be provided in a single device or component). In such an embodiment, content switch 28 behaves in the same manner as described above in identifying the user-ID and correlating it to an IP address or some other parameter associated with end user 12. Additionally, CSPG 32 behaves in a similar manner as described above in identifying an IP address of end user 12 in order to provide a service or a policy to a particular group of end users.

In operation, CSPG 32 matches a source IP address or some other parameter associated with end user 12 with a source profile or end user 12. This may be accomplished in a variety of ways. For example, upon receipt of a request packet from a client or end user 12, CSPG 32 may query a database or otherwise proxy RADIUS flows that are going to AAA server 36. By gleaning information from the RADIUS packets flowing within communication system 10, CSPG 32 may learn information about a user, source, or client based on the RADIUS packet propagation. For example, Access Requests, Access Accepts, Accounting Requests, and Accounting Acknowledgments may include information that CSPG 32 may use identifying end user 12 or a source profile.

The coordination of CSPG 32 and content switch 28 provides a model that may be used in conjunction with caches or proxies. Caches or proxies may operate to maintain or otherwise temporarily store content data and further facilitate identification of the user-ID. Alternatively, CSPG 32 and content switch 28 may be used in conjunction with other elements that facilitate such identification, allowing a correlation to be made between a user-ID and end user 12 or a source profile associated with end user 12.

AAA server 36 is a server program that handles requests by end user 12 for access to networking resources. Networking resources refers to any device, component, or element that provides some functionality to end user 12 communicating in communication system 10. For a corresponding network, AAA server 36 may also provide authentication, authorization, and accounting services and management. Authorization generally refers to the process of giving end user 12 permission to do or to access something. In multi-user computer systems, a system administrator may define for the system which end users are allowed access to given data in the system and, further, what privileges for end user 12 are provided. Once end user 12 has logged into a network, such as for example IP network 38 or access network 14, the network may wish to identify what resources end user 12 is given during the communication session. Thus, authorization within communication system 10 may be seen as both a preliminary setting up of permissions by a system administrator and the actual checking or verification of the permission values that have been set up when end user 12 is attempting access. Authentication generally refers to the process of determining whether end user 12 is in fact who or what it is declared to be. In the case of private or public computer networks, authentication may be commonly done through the use of unique identification elements or log-on passwords. Knowledge of the password offers a presumption that a given end user is authentic. Accounting generally refers to tracking usage for each end user or each network and may additionally include trafficking information or data relating to other information flows within communication system 10 or within a particular sub-network.

AAA server 36 may receive the IP address and other parameters from any suitable source, such as CSPG 32 or alternatively from a dynamic host configuration protocol (DHCP) server or a domain name system (DNS) database element, in order to direct data to be communicated to end user 12. AAA server 36 may include any suitable hardware, software, component, or element that operates to receive data associated with end user 12 and provides corresponding AAA related functions to network components within communication system 10. Authorization and IP address management may be retrieved by AAA server 36 from a layer two tunneling protocol network server (LNS), which may be provided to address secure services for end user 12 where appropriate. The assigned IP address may be a private or a routable IP address. On assignment of the IP address, the DHCP server may perform update procedures for updating the assigned IP address and leasing parameters for end user 12.

IP network 38 represents a series of points or nodes of interconnected communication paths for receiving and transmitting packets of information that propagate through communication system 10. IP network 38 offers a communicative interface between web server 40 and proxy gateway 20 and may be any LAN, WLAN, MAN, WAN, or any other appropriate architecture or system that facilitates communications in a network environment. IP network 38 implements a TCP/IP communication language protocol in a particular embodiment of the present invention, however IP network 38 may alternatively implement any other suitable communication protocol for transmitting and receiving data packets within communication system 10.

Web server 40 represents a program that, using the client/server model and the world wide web's HTTP, serves the files that form web pages to web users. For purposes of teaching the present invention, an example web server 40, yahoo.com, is provided and offers information sought to be retrieved by end user 12. Web server 40 may be provided as part of a larger package of internet and intranet-related programs for serving e-mail, downloading requests for file transfer protocol (FTP) files, building and publishing web pages, or any other suitable network operations according to particular needs. Alternatively, web server 40 may be any suitable location in a network environment sought to be contacted, queried, or otherwise accessed by end user 12.

FIG. 2 illustrates table 48 in accordance with one embodiment of the present invention. Table 48 may store one or more user-IDs that correspond to a given end user 12 having a source profile associated therewith. Table 48 may be included in any suitable element within communication system 10, such as within content switch 28, proxy gateway 20, or CSPG 32, for example. Additionally, table 48 may be included within a database that is accessible by any element within communication system 10. The database may be external to communication system 10, a separate component within communication system 10, or included within any element of communication system 10 in accordance with the teachings of the present invention.

Table 48 may be populated in a variety of ways. For example, when end user 12 connects to a corresponding network, a RADIUS request may be made on its behalf by NAS 18. This request may contain the user-ID in the User-Name attribute for example, which may uniquely identify the user requesting the information from the network. If AAA server 36 authenticates and authorizes the user successfully, a RADIUS Access-Accept message may be communicated back to the RADIUS client (proxy gateway 20 or NAS 18) with an IP address in the framed-IP address attribute. This IP address is the address used by the client or end user 12 when it sends IP packets to proxy gateway 20. Content switch 28 inspects the RADIUS packets exchanged and generates a segment or an entry of table 48 that binds a user-ID with an assigned IP address. Content switch 28 may also glean this information from RADIUS Accounting-Request packets sent by NAS 18 on behalf of end user 12.

Entries within table 48 may be cleaned up, deleted, or updated periodically (or alternatively updated or changed based on some event or modification to system parameters) in order to accurately reflect one or more user-IDs or unique identities associated with one or more end users 12 or source profiles. Entries could also be deleted specifically or deleted per communications flow. In the case of RADIUS messaging, the population of table 48 may be controlled by RADIUS accounting messages or by any other suitable populating protocol where appropriate and according to particular needs.

In operation, table 48 allows end user 12 or a client to be accurately identified by the user-ID that was placed in a request packet by proxy gateway 20. Content switch 28 may search its local table to find the assigned IP address for the corresponding end user 12 or client. Content switch 28 may then translate the source IP address from the proxy gateway address to the IP address provided in table 48 that stores the relationships between the user-ID and the corresponding source profiles.

Figure 3:
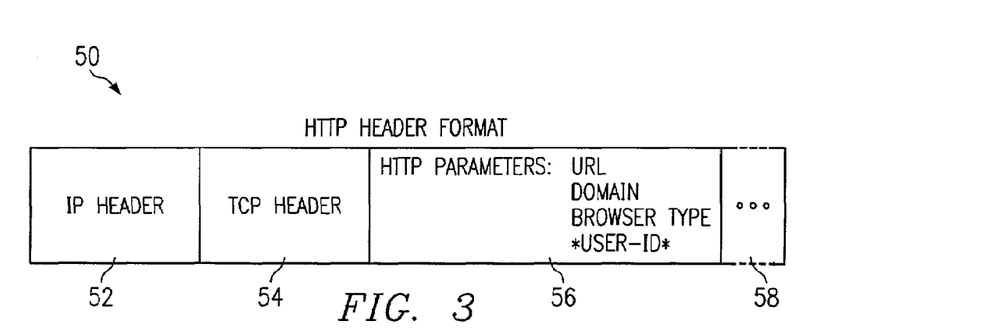
FIG. 3 is a simplified block diagram of a hyper-text transfer protocol (HTTP) header format, which includes a unique identifier associated with a source communicating in the network environment.

FIG. 3 is a block diagram of an HTTP header format 50 in accordance with one embodiment of the present invention. HTTP header format 50 is provided to illustrate that a unique identifier may be positioned anywhere in order to provide a correlation between end user 12 and a request packet as it propagates through communication system 10. HTTP header format 50 comprises an IP header 52, a TCP header 54, a set of HTTP parameters 56, and a miscellaneous header portion 58. The set of HTTP parameters 56 may include any suitable information, such as: data relating to a URL, domain information, or a browser type, for example. In a particular embodiment of the present invention, HTTP parameters section 56 includes a user-ID inserted by proxy gateway 20. The user-ID provides a correlation between a user or a source and the request packet initiated by end user 12. Alternatively, the user-ID, or any other unique identifier, may be inserted in proprietary IP header options, proprietary TCP header options, in miscellaneous header portion 58, or in any other suitable location where appropriate.

Figure 4:
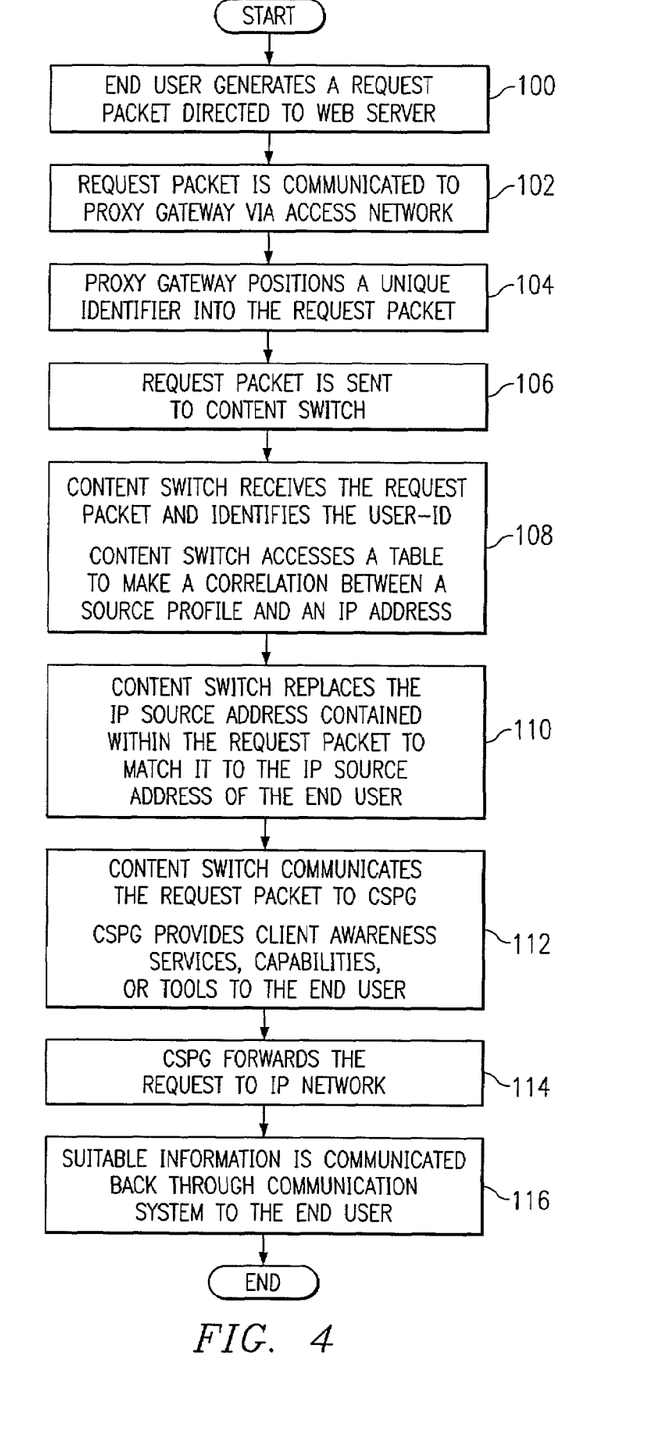
FIG. 4 is a flowchart illustrating a series of steps associated with a method for providing source awareness in a network environment.

FIG. 4 is a flowchart illustrating a series of steps associated with a method for providing source awareness in a network environment. The method begins at step 100, where end user 12 initiates a request for a piece of data or for information, such as a uniform resource locator (URL) for yahoo.com, for example. End user 12 may initiate or otherwise open a communication session to proxy gateway 20 using access network 14. End user 12 may send a "get" packet (within a data packet) to proxy gateway 20 as illustrated in step 102. The source in initiating this process is end user 12 with the destination address or destination IP being proxy gateway 20. Proxy gateway 20 generates or otherwise passes a request in HTTP/HTML format on behalf of end user 12. Once the response is later received from IP network 38, proxy gateway 20 may convert the HTTP/HTML response into a suitable format that provides translated content to end user 12.

In step 104, proxy gateway 20 positions a user-ID or a unique identifier into the request packet and then sends the request packet to content switch 28 as illustrated in step 106. At step 108, content switch 28 receives the request packet and identifies the user-ID. Content switch 28 may then access table 48 or any other internal or external table or database in making a correlation between a source profile or end user 12 and an IP address (or some other unique identifier). At step 110, content switch 28 may then translate the IP source address contained within the request packet to match the IP source address of end user 12 that originated the request for information within communication system 10. Content switch 28 may then communicate the request packet to CSPG 32 at step 112.

CSPG 32 may now perform adequate client-awareness services in providing capabilities or tools to end user 12 because the request packet now includes a proper source identifier as indicated by the corresponding IP address (or some other unique identifier). Additionally, CSPG 32 may also access AAA server 36 in authenticating, authorizing, or providing accounting features to end user 12. End user 12 may also be provided with content filtering, priority enhancements, permissions for access to areas of a network, billing information, or any other service or feature that may be provided to any user operating in a network environment.

At step 114, CSPG 32 may then forward the request to IP network 38, which may in turn suitably process the request packet or otherwise communicate the request packet to web server 40 in order to retrieve the requested information. At step 116, the information may then be suitably communicated back through communication system 10 via proxy gateway 20 and to end user 12 and thereby satisfy the original query or request generated by end user 12. End user 12 may then initiate another request or query to IP network 38 where appropriate and generate a corresponding request packet that propagates in a similar fashion through communication system 10. Some of the steps illustrated in FIG. 4 may be changed or deleted where appropriate and additional steps may be added according to particular needs without departing from the teachings of the present invention.

Communication system 10 may be used in a host of communications environments, such as for example in conjunction with a code division multiple access (CDMA) network. In a CDMA environment, all users of the CDMA system use the same carrier spectrum and may transmit simultaneously. Each user has his own pseudo-random code word. Whenever a user of CDMA seeks to transmit, an associated system may correlate a message signal with the code word. The receiver performs decorrelation on the received signal. For detection of the message signal, the receiver identifies the code word used by the transmitter. Because many users of the CDMA system share the same frequency, CDMA systems could benefit from the teachings of the present invention in providing an accurate and efficient routing protocol for information packets generated by end user 12. IS-95 may also utilize the CDMA scheme in conjunction with the present invention.

Time division multiple access (TDMA) represents another protocol in which the disclosed configuration of communication system 10 may be implemented. In a TDMA access scheme, a group of end users 12 are multiplexed over the time domain, i.e. user U1 uses radio frequency F1 for time period T1 after which user U2 uses the same frequency F1 for time T1 and so on. The time axis is divided into equal length time slots. In TDMA, each user occupies a cyclically repeating time slot defining a channel with N time slots making up a frame. In using TDMA, it is possible to allocate different numbers of time slots per frame to different end users. Thus bandwidth can be supplied on demand to different users depending on user needs. GSM and the IS-54/IS-136-based United States Digital Cellular (USDC) system are some of the standards that may use TDMA in conjunction with the present invention. The source information approach for request packets propagating through communication system 10, may be implemented in a TDMA system in order to accurately identify end user 12.

Frequency division multiple access (FDMA) represents another communications environment in which communication system 10 may be employed. The FDMA system assigns individual frequency channels or bands to individual users whereby all users may transmit at the same time. These channels are assigned on demand to users requesting service. During the call no other user can share the same frequency band. A FDMA channel carries only one communications exchange or session, e.g. phone call, at a time. One or more end users 12, which may be used in conjunction with a FDMA system, may implement duplexers because both the transmitter and receiver operate at the same time. The Advanced Mobile Phone Service (AMPS) and the European Total Access Communication System (ETACS) represent some example standards that may use FDMA in conjunction with the source identification approach of the present invention.

Although the present invention has been described in detail with reference to particular embodiments, it should be understood that various other changes, substitutions, and alterations may be made thereto without departing from the spirit and scope of the present invention. For example, although the present invention has been described with reference to communications between end user 12 and IP network 38, the source identification protocol described herein may be implemented for communications between any components within or external to any suitable network. The present invention has merely described end user 12 and IP network 38 for purposes of teaching and instruction. This should not be construed to limit how or where the source identification protocol of the present invention is implemented. Moreover, the processing and routing configurations as described above may be implemented in conjunction with any component, unit, hardware, software, object, or element involved in the communications process.

In addition, although the present invention has been described with reference to table 48, table 48 may be eliminated such that information relating to the mapping of a user-ID and end user 12 is stored in any suitable element within or external to communication system 10. Additionally, other components within communication system 10 may also be eliminated, whereby their functions are executed by other components or elements. For example, NAS 18 may be eliminated, which may result in some of its functions being performed by access network 14. Many components discussed with reference to FIG. 1, such as CSPG 32, content switch 28, and proxy gateway 20 for example may be combined into a single unit (or multiple units where appropriate) without departing from the scope of the present invention.

Also, although communication system 10 has been described with reference to gleaning information from RADIUS flows, the operation of restoring source information associated with end user 12 may be based on any number of sniffing operations or information accessing or retrieval techniques not necessarily related to RADIUS flows. For example, in cable applications a table (such as table 48) may be provided that maps an IP address (or some other unique identifier) to end user 12 or to a source profile associated therewith. Such a table may be configured in any element within communication system 10, such as CSPG 32, content switch 28, AAA server 36, proxy gateway 20, access network 14 or IP network 38. Such a table may also be included in a suitable database positioned anywhere within or external to communication system 10. It is important to note that any element capable of gleaning or obtaining information about communication flows relating to end user 12 (in order to provide a client or a user-awareness operation to CSPG 32, proxy gateway 20, or content switch 28) is within the scope of the present invention.

Numerous other changes, substitutions, variations, alterations, and modifications may be ascertained by those skilled in the art and it is intended that the present invention encompass all such changes, substitutions, variations, alterations, and modifications as falling within the spirit and scope of the appended claims. In order to assist the United States Patent and Trademark Office (USPTO) and additionally any readers of any patent issued on this application in interpreting the claims appended hereto, Applicants wish to note that they do not intend by any statement in the specification to limit their invention in any way that is not otherwise reflected in the appended claims.

What is claimed is:

1. An apparatus for communicating in a network environment, the apparatus comprising:
  a content switch coupled to a proxy gateway that is operable to cause a computer to execute instructions to perform the following functions position an identifier into a request packet, wherein the content switch is operable to identify the identifier and to correlate the identifier to a source that generated the request packet, the content switch being further operable to receive the request packet and to position an internet protocol (IP) address associated with the source into the request packet before communicating the request packet to a next destination, the request packet being received by a client service packet gateway (CSPG) operable to match one or more IP addresses with one or more source profiles in order to provide one or more networking services to one or more selected sources.

2. The apparatus of claim 1, wherein the content switch comprises a table that includes one or more identifiers that correlate to one or more sources respectively, and wherein each of the sources is operable to generate one or more request packets in the network environment.

3. The apparatus of claim 1, wherein the matching is performed by the CSPG by accessing and querying a database.

4. The apparatus of claim 1, wherein the matching is performed by the CSPG by proxying RADIUS flows associated with a selected one or more sources.

5. The apparatus of claim 1, further comprising:
  an authentication, authorization, and accounting (AAA) server coupled to the CSPG and operable to authenticate the source associated with generating the request packet.

6. The apparatus of claim 5, wherein the AAA server operates to authorize the source associated with generating the request packet.

7. The apparatus of claim 5, wherein the AAA server operates to provide accounting services for the source associated with generating the request packet.

8. The apparatus of claim 1, further comprising:
  a network access server (NAS) operable to provide a communications interface between the source and the proxy gateway.

9. The apparatus of claim 1, further comprising:
  a database coupled to the content switch and operable to store a table that includes one or more identifiers that correlate to one or more sources respectively, wherein each of the sources is operable to generate one or more request packets that propagate in the network environment.

10. A method for communicating in a network environment, the method comprising:
  receiving a request packet; and
  positioning an identifier into the request packet, wherein the identifier may be identified and correlated to a source that generated the request packet, and wherein an internet protocol (IP) address associated with the source may be positioned into the request packet before communicating the request packet to a next destination where the request packet is received, and wherein one or more IP addresses are matched with one or more source profiles in order to provide one or more networking services to one or more selected sources.

11. The method of claim 10, further comprising:
  providing a table that includes one or more identifiers that correlate to one or more sources respectively, wherein each of the sources is operable to generate one or more request packets that propagate in the network environment.

12. The method of claim 10, wherein the matching is performed by accessing and querying a database.

13. The method of claim 10, wherein the matching is performed by proxying RADIUS flows associated with a selected one or more sources.

14. The method of claim 10, further comprising:
  authenticating the source associated with generating the request packet.

15. The method of claim 14, further comprising:
  authorizing the source associated with generating the request packet.

16. The method of claim 14, further comprising:
  providing accounting services for the source associated with generating the request packet.

17. The method of claim 10, further comprising:
  providing a communications interface for the source in order to facilitate propagation of the request packet.

18. The method of claim 10, further comprising:
  storing a table that includes one or more identifiers that correlate to one or more sources respectively in a database, wherein each of the sources is operable to generate one or more request packets that propagate in the network environment.

19. A system for communicating in a network environment, the system comprising:
  means for receiving a request packet; and
  means for positioning an identifier into the request packet, wherein the identifier may be identified and correlated to a source that generated the request packet, and wherein an internet protocol (IP) address associated with the source may be positioned into the request packet before communicating the request packet to a next destination where the request packet is received, and wherein one or more IP addresses are matched with one or more source profiles in order to provide one or more networking services to one or more selected sources.

20. The system of claim 19, further comprising:
  means for storing one or more identifiers that correlate to one or more sources respectively, wherein each of the sources is operable to generate one or more request packets that propagate in the network environment.

21. The system of claim 19, wherein the matching is performed by accessing and querying a database.

22. The system of claim 19, wherein the matching is performed by proxying RADIUS flows associated with a selected one or more sources.

23. The system of claim 19, further comprising:
  means for authenticating the source associated with generating the request packet.

24. The system of claim 23, further comprising:
  means for authorizing the source associated with generating the request packet.

25. The system of claim 23, further comprising:
  means for providing accounting services for the source associated with generating the request packet.

26. The system of claim 19, further comprising:
means for providing a communications interface for the source in order to facilitate propagation of the request packet.

27. The system of claim 19, further comprising:
means for storing a table that includes one or more identifiers that correlate to one or more sources respectively, wherein each of the sources is operable to generate one or more request packets that propagate in the network environment.

28. Software embodied in a computer readable media and operable to:
receive a request packet; and
position an identifier into the request packet, wherein the identifier may be identified and correlated to a source that generated the request packet, and wherein an internet protocol (IP) address associated with the source may be positioned into the request packet before communicating the request packet to a next destination where the request packet is received, and wherein match one or more IP addresses are matched with one or more source profiles in order to provide one or more networking services to one or more selected sources.

29. The software of claim 28, further operable to:
store one or more identifiers that correlate to one or more sources respectively, wherein each of the sources is operable to generate one or more request packets that propagate in the network environment.

30. The software of claim 28, wherein the matching is performed by accessing and querying a database.

31. The software of claim 28, wherein the matching is performed by proxying RADIUS flows associated with a selected one or more sources.

32. The software of claim 28, further operable to:
authenticate the source associated with generating the request packet.

33. The software of claim 32, further operable to:
authorize the source associated with generating the request packet.

34. The software of claim 32, further operable to:
provide accounting services for the source associated with generating the request packet.

35. The software of claim 28, further operable to:
provide a communications interface for the source in order to facilitate propagation of the request packet.

36. The software of claim 28, further operable to:
store a table that includes one or more identifiers that correlate to one or more sources respectively, wherein each of the sources is operable to generate one or more request packets that propagate in the network environment.

37. An apparatus for communicating in a network environment, the apparatus comprising:
a proxy gateway operable to position an identifier into a request packet, wherein the proxy gateway comprises a content switch operable to identify the identifier and to correlate the identifier to a source that generated the request packet, the content switch being further operable to receive the request packet and to position an internet protocol (IP) address associated with the source into the request packet before communicating the request packet to a next destination, wherein the proxy gateway further comprises a client service packet gateway (CSPG) operable to receive the request packet after the IP address associated with the source has been positioned by the content switch and to match one or more IP addresses with one or more source profiles in order to provide one or more networking services to one or more selected sources.

38. The apparatus of claim 37, wherein the content switch comprises a table that includes one or more identifiers that correlate to one or more sources respectively, and wherein each of the sources is operable to generate one or more request packets in the network environment.

39. The apparatus of claim 37, wherein the matching is performed by the CSPG by accessing and querying a database.

40. The apparatus of claim 37, wherein the matching is performed by the CSPG by proxying RADIUS flows associated with a selected one or more sources.

41. The apparatus of claim 37, further comprising:
an authentication, authorization, and accounting (AAA) server coupled to the CSPG and operable to authenticate the source associated with generating the request packet.

42. The apparatus of claim 41, wherein the AAA server operates to authorize the source associated with generating the request packet.

43. The apparatus of claim 41, wherein the AAA server operates to provide accounting services for the source associated with generating the request packet.

44. The apparatus of claim 37, further comprising:
a network access server (NAS) operable to provide a communications interface between the source and the proxy gateway.

45. The apparatus of claim 37, further comprising:
a database coupled to the content switch and operable to store a table that includes one or more identifiers that correlate to one or more sources respectively, wherein each of the sources is operable to generate one or more request packets that propagate in the network environment.

* * * * *